(12) United States Patent
Tarasinski et al.

(10) Patent No.: US 8,573,340 B2
(45) Date of Patent: *Nov. 5, 2013

(54) DRIVE SYSTEM FOR AN AGRICULTURAL OR INDUSTRIAL UTILITY VEHICLE

(75) Inventors: Nicolai Tarasinski, Frankenthal (DE); Rainer Gugel, Mannheim (DE)

(73) Assignee: Deere & Company, Moline, IL (US)

( * ) Notice: Subject to any disclaimer, the term of this patent is extended or adjusted under 35 U.S.C. 154(b) by 874 days.

This patent is subject to a terminal disclaimer.

(21) Appl. No.: 11/992,081

(22) PCT Filed: Aug. 28, 2006

(86) PCT No.: PCT/EP2006/065725
§ 371 (c)(1),
(2), (4) Date: Nov. 5, 2010

(87) PCT Pub. No.: WO2007/031399
PCT Pub. Date: Mar. 22, 2007

(65) Prior Publication Data
US 2011/0042155 A1     Feb. 24, 2011

(30) Foreign Application Priority Data

Sep. 15, 2005   (DE) .......................... 10 2005 044 179

(51) Int. Cl.
*B60K 1/02*   (2006.01)

(52) U.S. Cl.
USPC .......................................... 180/65.22; 475/5

(58) Field of Classification Search
USPC .......... 180/65.1, 65.21, 65.22, 65.25, 65.285; 475/5
See application file for complete search history.

(56) References Cited

U.S. PATENT DOCUMENTS

| | | | | |
|---|---|---|---|---|
| 5,669,842 | A | * | 9/1997 | Schmidt ............................ 475/5 |
| 5,998,307 | A | * | 12/1999 | Lam et al. ........................ 442/75 |
| 6,557,656 | B2 | * | 5/2003 | Haniu et al. ................... 180/65.6 |
| 6,811,508 | B2 | * | 11/2004 | Tumback ........................... 475/5 |
| 7,140,461 | B2 | * | 11/2006 | Morrow .................... 180/65.245 |
| 7,479,080 | B2 | * | 1/2009 | Usoro ............................... 475/5 |
| 7,748,482 | B2 | * | 7/2010 | Holmes et al. ............. 180/65.22 |
| 2002/0109357 | A1 | * | 8/2002 | Lilley et al. ................. 290/40 C |

* cited by examiner

*Primary Examiner* — John Walters
*Assistant Examiner* — Brian Swenson

(57) ABSTRACT

A drive system for an agricultural or industrial utility vehicle. The drive system comprises a drive assembly that generates a mechanical torque, a first, second and third electric machine, a first mechanical output interface used to drive at least one vehicle rude and a second mechanical output interface. An electric machine comprises a rotor which is connected to a shaft in a rotationally fixed manner. A shaft driven by the drive assembly is rotationally connected to the shaft of the first electric machine. The second output interface is used to mechanically drive a tool which can be coupled to the utility vehicle. The shaft of the second electric machine and/or the shaft of the third electric machine can be reversibly connected to the first mechanical output interface.

24 Claims, 6 Drawing Sheets

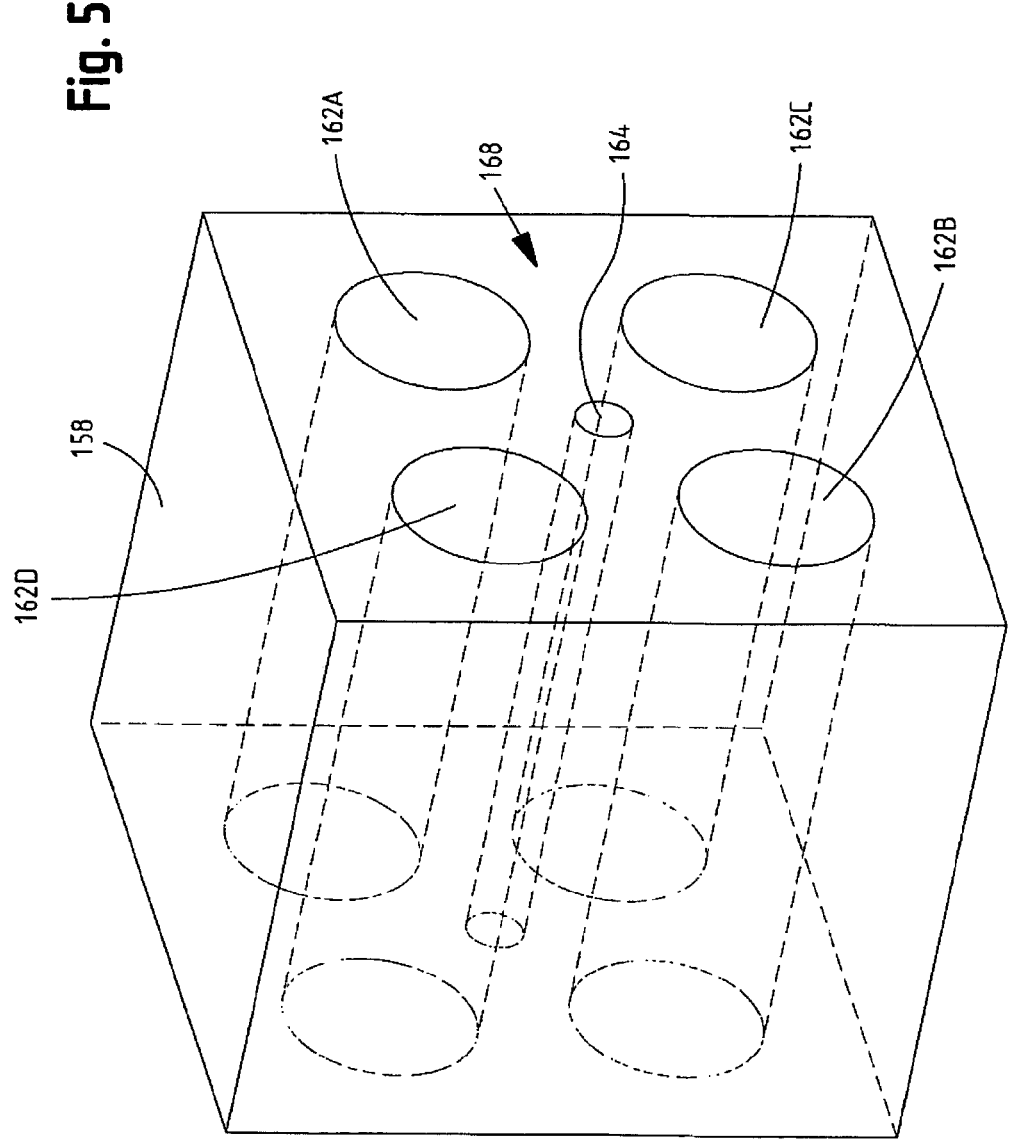

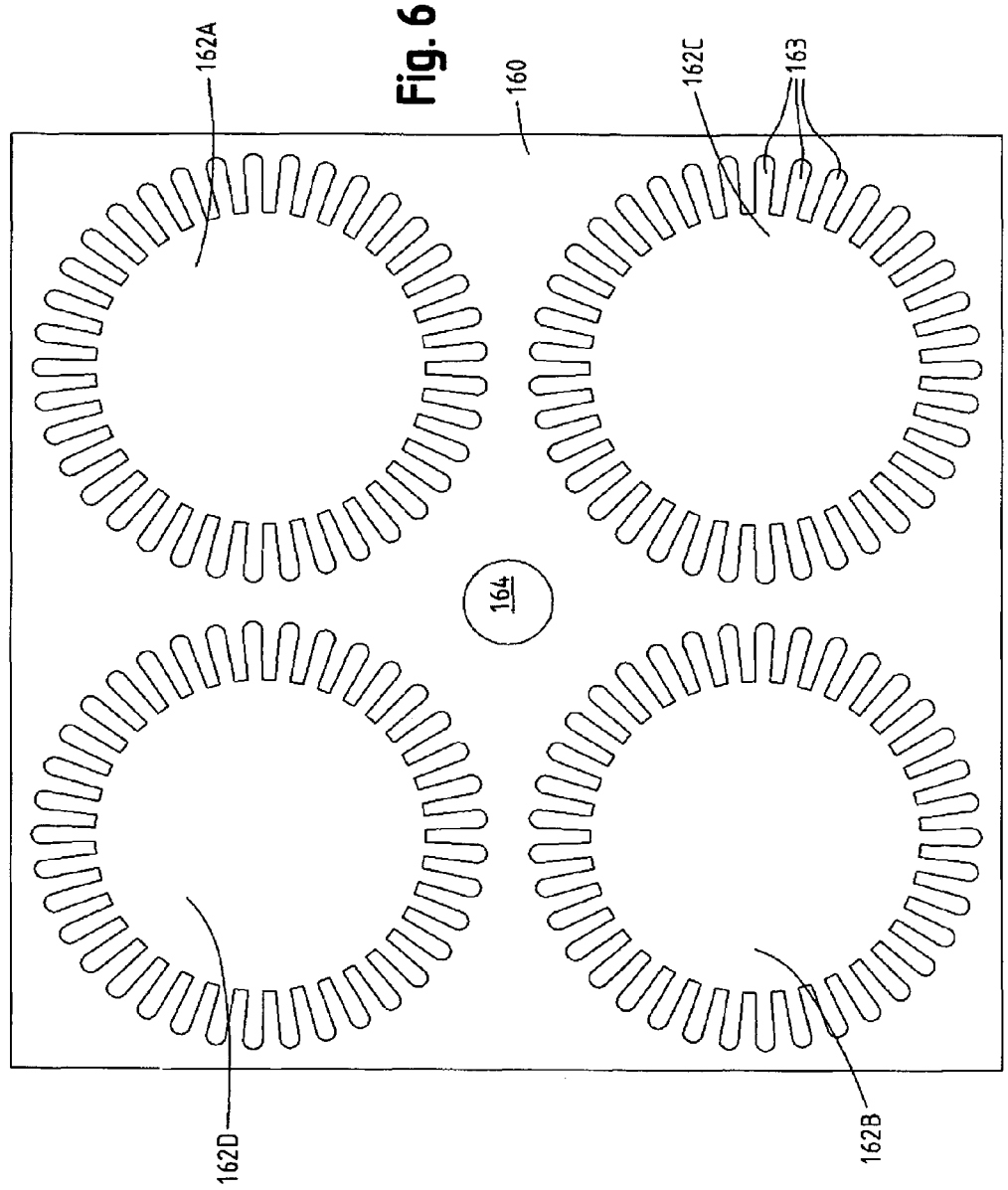

DRIVE SYSTEM FOR AN AGRICULTURAL OR INDUSTRIAL UTILITY VEHICLE

The invention concerns a drive system for an agricultural or industrial utility vehicle, preferably for a tractor. The drive system includes a drive assembly generating mechanical torque that is provided with a first, second and third electrical machine, a first mechanical output interface used for the drive of at least one vehicle axle and a second mechanical output interface. An electrical machine is provided with a rotor that is connected, fixed against rotation, to a shaft. A shaft driven by the drive assemblies is connected, so as to rotate, with the shaft of the first electrical machine. An operating implement that can be coupled to the utility vehicle and can be driven mechanically, is connected to the second mechanical output interface. The shaft of the second electrical machine and/or the shaft of the third electrical machine can be connected reversibly to the first mechanical output interface. Moreover the present invention concerns a stator arrangement of an electrical machine and an agricultural or industrial utility vehicle, particularly a tractor with such a drive system.

A drive assembly in the sense of the present invention is understood to include a motor, an internal combustion engine, a Diesel engine or a fuel cell.

Electric motors are used in increasing numbers to drive vehicles, they obtain their energy requirements, for example, from generators driven by internal combustion engines, batteries or fuel cells. To attain a greater spread of gear ratios in many cases electric motors are followed by gearboxes that can be shifted, in most cases, however, power is transmitted without gear ratios. The concept of the spread is understood to include the speed range over which the rated power output can be attained by a machine.

In the case of road and rail vehicles this procedure is generally adequate to attain the desired power output for driving and has been prescribed for agricultural vehicles. The spread here is in the order of magnitude from 5 to 10. The lowest speed at which the rated power output is reached is frequently above 20 km/h. In agricultural utility vehicles, particularly in tractors, this spread is not adequate. Values above 15 are required in order to cover the drive requirements of a tractor. The lowest speed at which the rated power output is reached is in the vicinity of 3 km/h. Due to the low absolute speed and the high drawbar pull of tractors, shift processes in which shifting must be accomplished in other speed ranges with similar drawbar pull, become very uncomfortable due to speed ratios available in the existing drive system and results in a jerk upon shifting.

In addition to their operating drive, tractors, in contrast to road or rail vehicles, are usually equipped with one or more further mechanical output drives for attached implements, a so-called power take-off drive (PTO), where such a mechanical output drive is associated with the second mechanical output interface, according to the present invention.

There are fundamentally several possibilities of arranging the two or three electrical machines in the space of the drive system. Accordingly the preferred arrangement would provide for three electrical machines in line, one behind the other, with their rotors arranged coaxially, that would agree, for example, with the preferred arrangement of DE10 2004 012 767, which had not yet been published at the time of the present application. An actual arrangement of this configuration is not detailed in that publication and can be performed fundamentally in many ways. In that way, for example, it would be conceivable to fasten each electrical machine by itself to a frame of the vehicle and to connect it to the necessary electrical connections and, if necessary, connect it to any required cooling system elements. Such an arrangement of the electrical machines, however, is costly in its configuration and expensive on the basis of the large number of individual components. Even the installation on a vehicle requires extensive time and therefore represents an additional cost factor.

Accordingly the purpose of the present invention is to define and further develop a drive system, a stator arrangement of an electrical machine and an agricultural or industrial utility vehicle of the kind cited above, by which the aforementioned problems are overcome. In particular, a simpler design of the arrangement of the electrical machine is to be defined with which a reduction in the cost can also be attained.

The purpose is met according to the invention by the teaching of patent claim 1. Further advantageous embodiments and further developments of the invention follow from the subordinate claims.

According to the invention a drive system of the kind cited initially is characterized by the fact that at least two of the three electrical machines are arranged or enclosed in/or at a common housing arrangement.

According to the invention it has been recognized at first that a combination of the electrical machines in a common housing arrangement or a common housing structure brings with it considerable advantages, particularly during the installation of the drive system in a vehicle. In that way particularly the electrical machines can be preassembled on a production line independently of an assembly of the entire vehicle and thereby combined in a single module, that includes the electrical machines and, if necessary, further components such as, for example, electronic power controls or cooling system elements. This housing arrangement or this almost completely preassembled module can then be installed on a production line with the remaining components of the drive system with a considerable saving of time, so that to a particularly great advantage the immediate assembly time on the production line of the vehicle chassis relative to the electrical machines can be kept very low. In other words the combination of at least two electrical machines in a common housing arrangement permits a modular assembly of these drive components.

The housing arrangement in the sense of the present invention is understood, particularly, to cover a supporting structure for the electrical machines. A single cover of the housing used for the sheathing for the electrical machines alone is not meant with a housing arrangement in the sense of the present invention. The first mechanical output interface is used to drive at least one vehicle axle. In case that the agricultural or industrial utility vehicle is configured in the form of a tractor, the first mechanical output interface is very particularly preferred used to drive the rear axle of the tractor. Optimally the first mechanical output interface can, in addition, be used to drive the front axle of the tractor, which can be included in the drive line, for example, by means of a clutch. Although the second mechanical output interface is used to mechanically drive an operating implement that can be coupled to the utility vehicle, the second mechanical output interface could be used, in addition or alternately, to drive a further mechanical consumer provided on the utility vehicle itself, for example, for the drive of a bailer of a combine.

It is very particularly preferred that at least two of the electrical machines be arranged adjacent to each other. In order to attain a compact configuration the electrical machines could be arranged immediately adjacent to each other in such a way that the housings of the electrical machines are largely in contact with each other. In general electrical machines will, however, be arranged in their housing arrangements spaced away from each other, where the actual spacing between two electrical machines may depend on various factors, for example, the available space in the utility vehicle or the requirements for the cooling of the electrical machines.

In a preferred embodiment the electrical machine is provided with a stator. The stators of at least two electrical machines are arranged in the common housing arrangement. Therefore the electrical machines, according to this embodiment, are arranged in such a way that their stators are arranged around an interior rotor, although fundamentally one or more electrical machines could be provided in the housing arrangement, whose stator is arranged in the interior of a rotor configured in the form of a hollow rotor.

In a very particularly preferred arrangement the electrical machines are arranged in the housing arrangement in such a way that the shafts of the electrical machines project from one side of the housing arrangement. Thereby a very favorable configuration can be attained for the drive system or the drive line particularly for agricultural or industrial utility vehicles and very particularly preferred for tractors. In that way, for example, the housing arrangement could be located almost immediately behind the drive system, and on the side of the housing arrangement facing away from the drive system a gearbox shift step could follow to which the shafts of the electrical machine can be coupled. A drive shaft of the drive assembly could extend into the housing arrangement and drive at least one electrical machine. At least one or more shafts or output shafts of the electrical machine could project out of the housing arrangement from the side of the housing arrangement facing away from the drive system and project into the gearbox shift stage in which, for example, two gearbox shift stages could be provided for changes in rotational speed range. In addition an output interface for an additional drive axle could be provided, so that mechanical torque could be transmitted to the rear axle of a tractor and also to the front axle of a tractor in a predetermined ratio by means of the gearbox shift stage.

In a preferred arrangement the housing arrangement is provided with at least one closure, to which at least two electrical machines can be fastened. The closure could be configured, for example, in the form of a end shield. In a very particularly preferred embodiment the housing arrangement is provided with two closures or two end shields, where the one closure is arranged on one side of the housing arrangement and where the other closure is arranged on the side of the housing arrangement opposite thereto. The stators of the electrical machines could be fastened to these closures or end shields. Hence the electrical machines could extend generally between the two end shields.

The housing arrangement could be provided with a center part that could be equipped with a metallic structure that could support at least two electrical machines. This center part of the housing arrangement could be arranged between the two closures of the housing arrangement. At least one closure could be arranged on the center part. The center part is preferably configured as a metallic stack. The metallic stack itself could be formed by individual sheet metal parts insulated against each other, whose cross section is configured in such a way that the stators of the electrical machines can be accommodated or integrated therein. In that way only a few housing components are required, in order to permit the housing arrangement to accommodate the electrical machines. Therefore, to a very particularly great advantage, a cost effective production of the drive system, according to the invention, can proceed under economic conditions.

It is very particularly preferred that at least two electrical machines be cooled by one common cooling arrangement. A cooling of the electrical machines by means of gas or liquid is conceivable. In that way coolant lines could be provided or routed in the center part of the housing arrangement, through which a coolant can circulate which absorbs at least a part of the heat generated by the electrical machines and conducts it to a coolant heat exchanger from the center part of the housing arrangement or from the housing arrangement itself.

As previously indicated, according to DE10 2004 012 767, which had not been published at the time of the submission of the present patent application, three electrical machines are arranged in line, one behind the other in such a way that the rotors of the electrical machines are arranged coaxially to each other. Such an arrangement (arranged one behind the other) is fundamentally advantageous when there is sufficient space in the longitudinal direction of the rotors of the electrical machines—usually oriented in the longitudinal axis of the vehicle. This is not always the case with agricultural or industrial utility vehicles and particularly with tractors. Accordingly in a very particularly preferred embodiment at least two of the electrical machines are arranged spatially in such a way that their shafts extend generally parallel to each other and are arranged offset to each other. Due to such an arrangement of the electrical machines the necessary space in one direction, transverse to the longitudinal axis of the vehicle, is greater than in the case of the in-line arrangement of the electrical machines arranged one behind the other. For that, however, the space in the longitudinal direction of the rotors of the electrical machines or in the longitudinal direction of the vehicle is smaller than in an in-line arrangement of the electrical machines, which is a particular advantage in the case of tractors.

In a space arrangement of the electrical machines with shafts generally arranged parallel to each other, at least two electrical machines are very particularly preferred arranged in the housing arrangement in such a way that they project outward from one side of the housing arrangement. This could be configured, for example, in such a way that the at least two electrical machines are fastened to a closure of the housing arrangement, for example, an end shield.

Particularly in tractors, there is an advantage if the shafts of the second and third machines can be coupled synchronously to each other, preferably over a gear or a spur gear. Preferably the two selected machines are continuously coupled synchronously to each other. Accordingly there is no mechanical gear box shift point provided with which the synchronous coupling of the two machines could be interrupted. In case that only a temporary synchronous operation of the two electrical machines is provided, a gear box shift point could be provided with which the synchronous coupling of the two machines could be interrupted.*

Since the shafts of the second and third electrical machines can be reversibly connected to the first mechanical output interface that is used for the forward movement of the utility vehicle, the utility vehicle can be operated flexibly by means of a synchronous coupling of these two electrical machines with a corresponding control arrangement for various operating modes or operating speeds. In that way it is conceivable, for example, that in an operating mode only the second electrical machine transmits mechanical torque to the first output interface and the rotor of the third electrical machine—which is then deactivated—rotates along merely without losses on the basis of the synchronous coupling. In case that a different operating mode is now to be used, the second electrical machine can be brought into a no-load condition shortly before the change-over, in this no-load condition the third electrical machine is loaded correspondingly or generates a mechanical torque for its part. Thereby, to a particularly great advantage, the third electrical machine would provide against an interruption of the flow of the torque in tractors for the duration of the change-over. This is relevant particularly with tractors since during a change-over into a different speed range a torque must be transmitted from the drive assembly to the operating drive or the wheels even during the change-over process (power shift gearbox), since otherwise the tractor would have been stopped immediately, if a no-load shift process had been performed (for example, during plowing).

In a very particularly preferred embodiment a fourth electrical machine is provided. The fourth electrical machine can be coupled to the first or the second mechanical output interface—in particular reversibly. The fourth electrical machine is preferably arranged in space adjacent to the first through third electrical machines. In that way, for example, the fourth electrical machine could also be arranged in the housing arrangement, so that a compact arrangement and/or a common cooling arrangement of the four machines is possible.

In order to combine in summation the torque generated by the drive assembly and the torque generated by an electrical machine, a summation gearbox with three mechanical interfaces could preferably be provided. The first interface of the summation gearbox could be coupled to a shaft driven by the drive assembly. The second interface of the summation gearbox could be coupled with the shaft of an electrical machine. The third interface of the summation gearbox could be coupled reversibly with the first mechanical output interface and/or with the second mechanical output interface of the drive system.

In actual fact the summation gearbox could be provided with a planetary gearbox.

According to a preferred embodiment the shaft driven by the drive assembly is connected, fixed against rotation, to the internal gear of the planetary gearbox. The planet carrier of the planetary gearbox can be coupled reversibly with the first mechanical output interface. The sun gear of the planetary gearbox can be coupled reversibly with the second, third or fourth electrical machine. Such a summation gearbox permits, to a very great advantage, very flexible application possibilities for the drive system, particularly with a second mechanical output interface (a power take-off drive interface) that can be operated independently of the first mechanical output interface, where the figure description will cover this in actual fact. In this connection, provision could be made for the shaft of the fourth electrical machine to be connected, so as to rotate, to the sun gear of the planetary gearbox. The rotor of the first electrical machine can be connected constantly, fixed against rotation, with a shaft driven by the drive assembly, the rotor of the fourth electrical machine could as well be connected constantly, fixed against rotation, with the sun gear of the planetary gearbox. However, a gear shifting point could be provided with which the first and/or the fourth electrical machine could be uncoupled from the shaft driven by the drive assembly or from the sun gear of the planetary gearbox.

In a preferred further development the second mechanical output interface can be driven by the planet carrier of the planetary gearbox coupled to the second mechanical output interface. Alternatively or in addition the second mechanical output interface can be driven in such a way that a shaft driven by the drive assembly is reversibly coupled to the second mechanical output interface. For this purpose a friction lock clutch or a disk clutch or a claw clutch could be provided, where the disk clutch could be configured as operated electromagnetically or hydraulically. Thereby the possibility exists fundamentally of driving the second mechanical output interface only with a part or with all of the mechanical torque generated by the drive assembly, in case that a corresponding clutch is engaged.

Moreover the second mechanical output interface can be driven only by the mechanical torque existing at the planet carrier of the planetary gearbox, in case a corresponding further clutch is engaged. It is also conceivable that the second mechanical output interface is operated by one part of the mechanical torque generated by the drive assembly as well as the torque existing at the planet carrier of the planetary gearbox. In this case both clutches are engaged and the mechanical torques are combined in summation to correspond. However this assumes that the components of the drive system are operated in such a way that there is no blocking of the drive system.

In most operating conditions of the drive system provision is made for at least one of the electrical machines being operated as a generator and that the electrical energy generated by an electrical machine is used to drive at least one of the two other electrical machines.

Solely for the sake of completeness it should be mentioned that an electrical machine operated as a motor or a generator preferably is a synchronous machine or—less preferred—an asynchronous machine or that it could be operated under the principle of a synchronous machine or an asynchronous machine. In that way an inverse rectifier or a frequency converter could be provided for each electrical machine. Since electric current is generated by means of an electrical machine operated as a generator which is driven by the drive system and the drive system is provided with a variable rotational speed that is a function of the immediate operating situation of the utility vehicle, the alternating electric current generated by the electrical machine operated as a generator will be provided with a variable frequency. Such an inverse rectifier could be used to rectify the alternating current of variable frequency into alternating electric current of a predetermined, essentially constant frequency. The alternating electric current of variable frequency generated by the electrical machine operated as a generator could be converted by means of the inverse rectifier, initially into direct current and then into alternating current of a predetermined frequency. This alternating current could then be used, for example, to drive an electrical machine or other electrical components. Preferably a direct current circuit with at least one electric accumulator is provided. This direct current circuit is supplied by the inverse rectifier and could be used in other words as an intermediate current circuit, to which electrical consumers could be connected directly that can be operated by direct current. The electric accumulator could be configured, for example, in the form of a battery or a condenser dimensioned correspondingly. Very particularly preferred as well at least one inverse rectifier is provided with which the direct current can be converted into alternating current of a predetermined frequency or alternating current of a predetermined succession of variable frequencies. With this, for example, at least one electrical machine or electrical consumer can be operated, that is driven by alternating current.

In a very particularly preferred embodiment the three or four electrical machines are essentially configured identically and/or are provided with an essentially comparable power characteristic. Thereby a favorable configuration of the drive system, according to the invention, for agricultural or industrial utility vehicles, particularly for tractors, can be attained where, for example, a very simply structured control system of the third or fourth electrical machine makes possible a shifting between different operating modes without any jerk during shifting, since the power characteristics of the second and third electrical machines are essentially identical and driver steps or power electronics components can be generally configured identically.

Particularly when the drive system, according to the invention, is applied to tractors, a first operating condition is provided, in which the first electrical machine is operated as a generator and the second and third electrical machines are operated as motors, and are connected to the first mechanical output interface. The mechanical torque generated by the second and third electrical machines is transmitted to the first mechanical output interface. In this operating condition the operating drive of the tractor is performed exclusively by the two electrical machines. In this operating mode a tractor equipped correspondingly may, for example, be operated at a speed of up to 25 Km/hour in the forward or the reverse operation. Here it is also possible to attain a power take-off shaft operation over the second mechanical output interface—in particular even in continuous operation—, which will be covered in greater detail in the following.

Moreover a second operating condition is provided, in which the fourth electrical machine, that is operated as a generator, can be driven with a part of the mechanical torque generated by the drive assembly. The second and third electrical machines are operated as motors. The mechanical torque generated by the second and the third electrical machines can be transmitted to the first mechanical output interface along with a further part of the mechanical torque generated by the drive assembly. This operating mode represents a torque division gearbox structure in a "speed/split" configuration. The power transmitted by the drive assembly is branched in the summation gearbox and is again combined in a summation in the first mechanical output interface. In that way a part of the power output is transmitted mechanically and a further part of the power output is transmitted electrically. This operating mode is appropriate particularly for a slow forward operation up to 25 Km/hour and heavy towing operation of a tractor.

A third operating condition is also provided, in which the first electrical machine is operated as a generator. The fourth electrical machine is operated as a motor. The mechanical torque generated by the fourth electrical machine can be transmitted along with the mechanical torque generated by the drive assembly and combined in a summation and can be transmitted over the first mechanical output interface. Thereby a torque split gearbox structure is attained in a "torque split" configuration. This operating mode is preferably used for operations of the tractor at higher operating speed, for example, between 25 and 50 Km/hour.

In a particularly preferred embodiment the fourth electrical machine is operated as a motor. The torque generated by the fourth electrical machine and—in case that a corresponding clutch is engaged—at least one part of the mechanical torque generated by the drive assembly can be transmitted to the second mechanical output interface. Thereby the second mechanical output interface or the power take-off shaft (PTO) of the tractor can be driven, on the one hand, only by the fourth electrical machine, in particular generally independently of the immediate rotational speed of the drive assembly. On the other hand the second mechanical output interface can be driven simultaneously by the fourth electrical machine and at least by one part of the mechanical torque generated by the drive assembly.

With regard to a stator arrangement the purpose of the invention cited initially is met by the characteristics of patent claim 24. Accordingly a stator arrangement of an electrical machine is provided with a recess to accommodate a rotor of the electrical machine. According to the invention at least a further recess is provided to accommodate at least a further rotor.

In many applications more than one motor driven electrical machine is applied. Now there is fundamentally a possibility of arranging or configuring several of these electrical machines—as already suggested according to the invention in patent claim 1—in or on a common housing arrangement. Thereby these electrical machines are arranged close to each other in space that results in a compact arrangement despite the small available space. Beyond that the invention has recognized that in such applications a compact arrangement is possible not only to great advantage but beyond that an assembly can be configured consisting of fewer individual components to a very great advantage that can provide the functions of at least two electrical machines operated as motors, which can be operated independently of each other. In other words the two electrical machines are combined in a common assembly that permits a more cost effective manufacture. If necessary the stator arrangement must be configured in such a way that the maximum total magnetic flux that occurs therein is considered, so that the material of the stator arrangement is not overloaded. Alternatively the electrical machines could be controlled or operated in such a way that a predetermined maximum magnetic flux in the stator arrangement is not exceeded. Coils could be provided in or on the recesses of the stator arrangement that provide the functions of the coils of the stators known from the state of the art in conventional electrical machines.

In a very particularly preferred manner the recesses of the stator arrangement according to the invention are arranged in such a way that thereby a housing arrangement or a stator arrangement for a housing arrangement can be attained according to one of the claims 1 through 23, in actual fact, according to one of the claims 1 through 10. In so far as repetitions can be avoided, reference is made to the preceding part of the description.

With respect to an agricultural or industrial utility vehicle, and particularly with respect to a tractor, the purpose of the invention cited above is met by the characteristics of patent claim 25. Accordingly an agricultural or industrial utility vehicle, in particular a tractor, is characterized by a drive system according to one of the patent claims 1 through 23. To avoid repetition reference is made to the preceding part of the description.

There are now various possibilities to embody and further develop the teaching of the present invention in an advantageous manner. For this purpose reference is made on the one hand to the patent claims subordinate to patent claim 1 and on the other hand to the following explanations of the preferred embodiments of the invention on the basis of the drawing. In connection with the explanation of the preferred embodiments of the invention on the basis of the drawing in general preferred embodiments and further developments of the teaching are also explained.

FIG. 1 schematically shows a stick diagram of a first embodiment of a drive system according to the invention.

FIG. 2 schematically shows a stick diagram of a second embodiment of a drive system according to the invention.

FIG. 3 schematically shows a stick diagram of a third embodiment of a drive system according to the invention.

FIG. 5 shows a schematic perspective view of a housing part of FIG. 4.

FIG. 6 shows a schematic cross section view or plan view of a sheet metal section of the housing part of FIG. 5.

Figure 1:
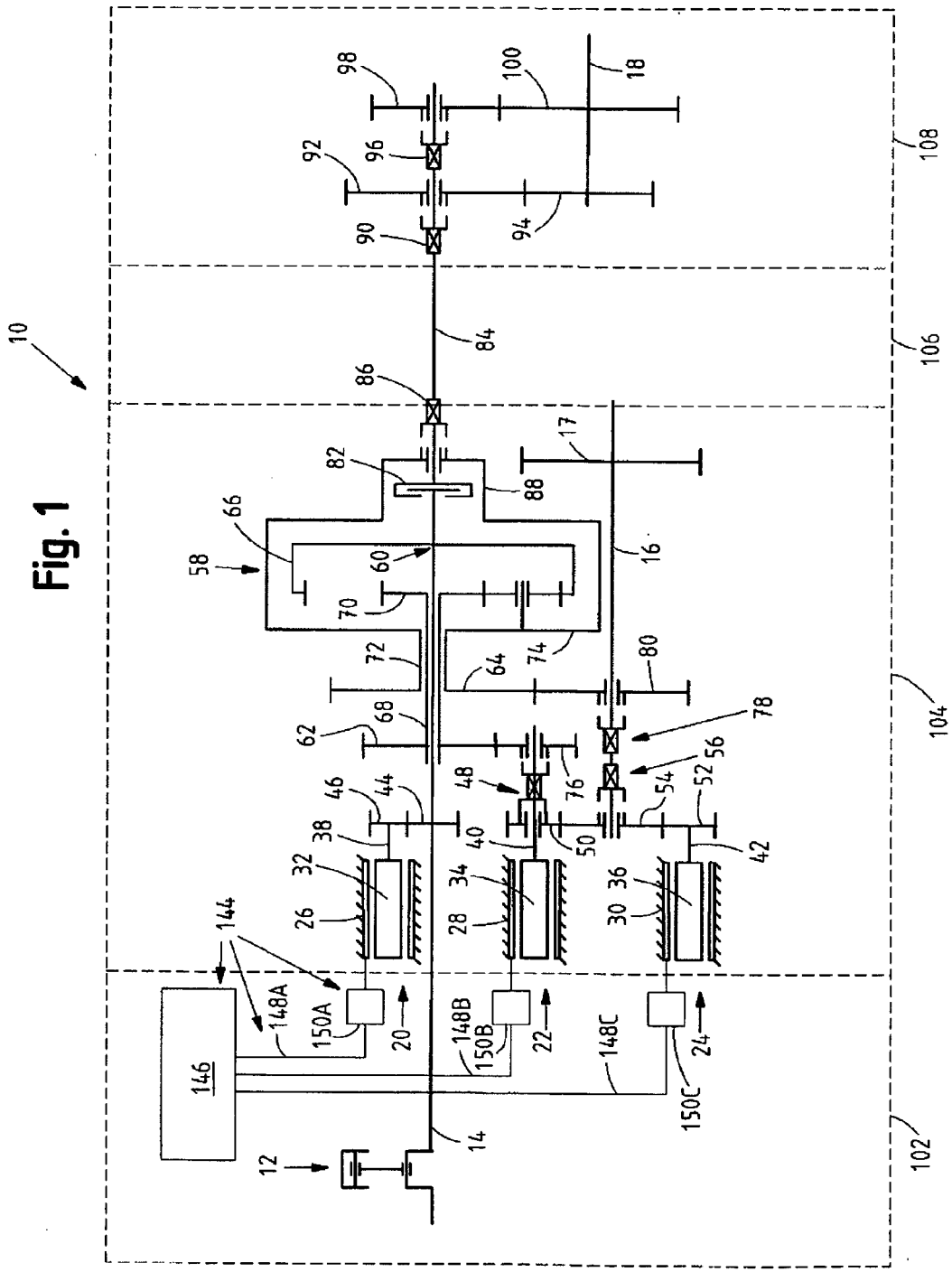

In the figures equal or similar groups of components are identified by the same part number call-outs. FIG. 1 shows the drive system 10 of an agricultural utility vehicle or tractor not shown completely in the figures. The tractor includes a drive assembly 12 that includes an internal combustion engine and which, for the sake of simplicity, is designated in the following as internal combustion engine 12. The internal combustion engine 12 is coupled to a drive shaft 14 with which further components of the drive system 10 can be driven.

A first mechanical output interface 16 is driven by the drive system 10, where the first mechanical output interface 16 is used to drive the rear axle of the tractor (not shown in FIG. 1) and in addition to drive the front axle or the wheels of the front axle of the tractor (not shown in FIG. 1). A coupling possibility with respect to this matter for a front axle is indicated by the gear identified by the part number callout 17. Moreover a further mechanical output interface 18 is provided (that can also be identified here as power take-off shaft), that is used to drive an operating implement (not shown in FIG. 1) that can be coupled to the tractor.

A first, second and third electrical machine 20, 22, 24 is provided. The electrical machines 20, 22, 24 are generally configured identically and hence display a comparable power characteristic. Each of the electrical machines 20, 22 and 24 is provided with a stator 26, 28 and 30 as well as a rotor 32, 34 and 36. The rotor 32 is connected, fixed against rotation, to the shaft 38, the rotor 34 is connected, fixed against rotation, to the shaft 40 and the rotor 36 is connected, fixed against rotation, to the shaft 42. The rotor 32 of the first electrical machine 20 is constantly connected, fixed against rotation, to the drive shaft 14 by means of the shaft 38 and the intermediate gearset consisting of the two gears 44, 46.

The rotor 34 of the second electrical machine 22 together with the shaft 40 can be connected, fixed against rotation, with the gear 50 by means of the gear shifting point 48. The gear 52 is connected, fixed against rotation, with the shaft 42. The gear 50 as well as the gear 52 in each case meshes with the gear 54. The gear 54 can be connected by means of the gear shifting point 56, fixed against rotation, with the first mechanical output interface 16 or the operating drive of the tractor. Thereby the shafts 40, 42 of the rotors 34, 36 of the second electrical machine 22 and the third electrical machine 24 can be coupled to each other synchronously, as long as the gear shifting point 48 of FIG. 1 is in the left engaged condition.

A summation gearbox 58 is provided with which the torque generated by the internal combustion engine 12 and the torque generated by an electrical machine, for example, by the second electrical machine 22, can be combined in a summation. The summation gearbox 58 is configured generally in the form of a planetary gearbox and includes three mechanical output interfaces 60, 62, 64. The first mechanical output interface 60 of the summation gearbox 58 is connected, fixed against rotation, to the drive shaft 14 and the internal gear 66 of the summation gearbox 58. The second mechanical output interface 62 is represented by the gear indicated by the part number call-out 62, which is connected, fixed against rotation, to the hollow shaft 68 and the sun gear 70 of the summation gearbox 58. The third mechanical output interface 64 is formed by the gear 64 that was identified with the same part number call-out 64, this gear is connected, fixed against rotation, over the hollow shaft 72 with the planet carrier 74 of the summation gearbox 58.

When the gear shifting point 48 is in its right engaged condition the shaft 40 of the second electrical machine 22 is connected, fixed against rotation, to the gear 76. The gear 76 meshes with the gear 62 which represents the second mechanical output interface of the summation gearbox 58. Thereby a flow of torque can be established between the second electrical machine 22 and the second mechanical output interface 62 of the summation gearbox 58. A connection, fixed against rotation, can be established between the first mechanical output interface 16 and the gear 80 with the gear shifting point 78. The gear 80 meshes with the gear 64 or with the third mechanical output interface 64 of the summation gearbox 58.

With the clutch 82, configured in the form of a disk clutch, a connection, fixed against rotation, can be established between the drive shaft 14 and the shaft 84. A connection, fixed against rotation, can be established between the shaft 84 and the rotating part 88 with the gear shifting point 86, where the rotating part 88 is connected, fixed against rotation, to the planet carrier 74.

A connection, fixed against rotation, can be established between the shaft 84 and the gear or chain 92 with the gear shifting point 90. The gear or chain 92 meshes with the gear 94 which is connected, fixed against rotation, with the second mechanical output interface 18. A connection, fixed against rotation, can be established between the shaft 84 and the gear 98 with the gear shifting point 96. The gear 98 meshes with the gear 100 which is connected, fixed against rotation, with the second mechanical output interface 18. Thereby a flow of torque can be established with the shaft 84 over the chain 92, 94 to the second mechanical output interface 18 over the gear shifting point 90 on the one hand and on the other hand with the gear shifting point 96 in each case with differing transmission ratios a flow of torque can be transmitted over the chain 98, 100 from the shaft 84 to the second mechanical output interface 18.

The regions 102 through 108 shown by dashed lines indicate the following assemblies of components of the tractor shown in FIG. 1: 102 indicates the group of assemblies around the internal combustion engine 12, 104 indicates the gearbox housing, 106 indicates the rear axle differential housing assemblies and 108 indicates the power take-off shaft housing assembly. Shown only schematically, the first mechanical output interface 16 enters into the rear axle differential housing assembly 106.

Figure 2:
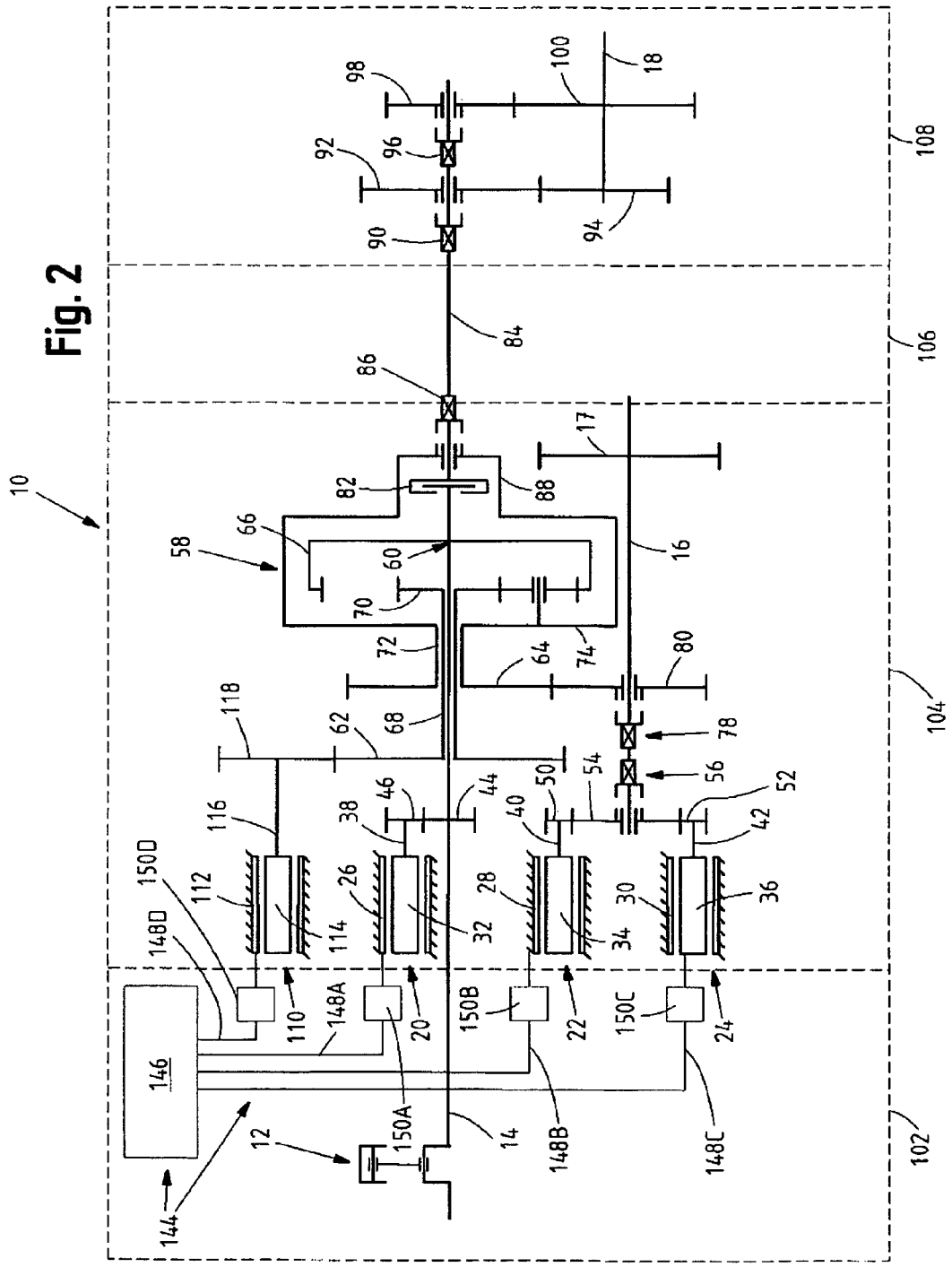

FIG. 2 shows a further embodiment of the present invention in which a fourth electrical machine 110 is provided. The fourth electrical machine 110 is provided with a stator 112 and a rotor 114. The rotor 114 is connected, fixed against rotation, with the shaft 116 and the gear 118. The gear 118 meshes with the gear 62 or the second mechanical output interface 62 of the summation gearbox 58. The electrical machines 20, 22, 24, 110 are generally configured identically and are provided with a generally comparable power characteristic.

The embodiment shown in FIG. 2 of a drive system 10 is configured generally comparably to the drive system 10 shown in FIG. 1. A difference here is that the electrical machine 110 is constantly connected with the second mechanical output interface 62 of the summation gearbox 58 over the shaft 116 and the gear 118. In this embodiment the electrical machine 22 cannot be connected directly to the second mechanical output interface 62 of the summation gearbox 58, since a gear shifting point corresponding to the gear shifting point 48 of FIG. 1 is not provided in the embodiment according to FIG. 2. The rotor 34 of the electrical machine 22 is constantly connected synchronously, fixed against rotation, with the rotor 36 of the electrical machine 24 over each of the shafts 40, 42 and the gears 50, 52, 54.

Figure 3:
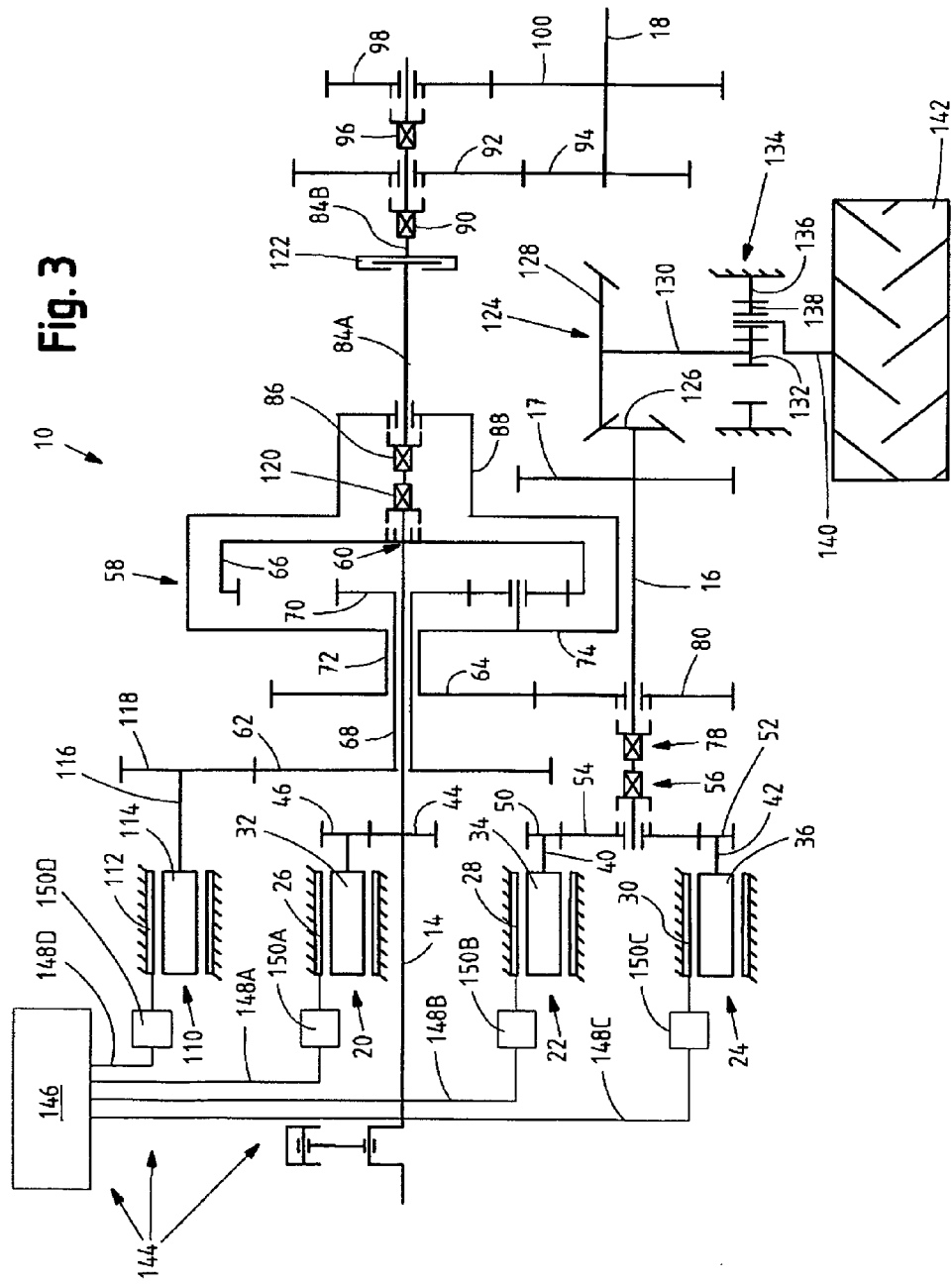

FIG. 3 shows a further embodiment of a drive system 10 according to the invention, that is generally comparable to the embodiment of FIG. 2. Only that in the gear shifting point 120 shown in FIG. 3, the clutch 82 of FIG. 2 is configured in the form of a claw clutch replacing the disk clutch 82 that can be shifted synchronously, the claw clutch is arranged between the drive shaft 14 and the shaft 84A. The positive lock gear shifting point 86 is relocated into the interior of the rotating part 88 and, for the sake of simplicity, identified by the same part number callout 86. A friction lock disk clutch 122 is arranged between the shaft 84A and the shaft 84B, when this clutch is engaged in a rotary synchronization of the power take-off shaft component is possible along with adapted attached implements and when the clutch is engaged a torque can be transmitted from the shaft 84A to the second mechanical output interface 18.

The rear axle differential gearbox 124 is shown in FIG. 3 in somewhat greater detail. Here the bevel gear 126 is connected, fixed against rotation, to the first mechanical output interface 16. The bevel gear 126 meshes with the gear 128, which is connected, fixed against rotation, to the shaft 130. The shaft 130 is connected, fixed against rotation, to the sun gear 132 of the intermediate planetary gearbox 134 through which the internal gear 136 is arranged, fixed against rotation, in the axle housing, not shown in FIG. 3. The planet carrier 138 of the intermediate planetary gearbox 134 is connected, fixed against rotation, to the drive shaft 140 which, finally, drives the wheel 142 of the tractor.

As far as the control of the electrical machine 20, 22, 24 and, if necessary 110 is concerned, the electronic control arrangement 144 is provided. The control arrangement 144 includes an electronic control unit 146 which—at least as shown in FIGS. 1 through 3—also includes groups of assemblies of an electronic power control as well as an electronic converter for the conversion of alternating current into direct current and the reverse. The electrical machines 20, 22, 24, 110 are connected to supply lines 148A through 148D and lines to the electronic control unit 146 where in each case a converter or rectifier unit 150A through 150D is provided. As a function of the control of an electrical machine 20, 22, 24, 110 by the electronic control unit 146 it is possible to operate one of the electric machines 20, 22, 24, 110 either as a generator or as a motor. In case that an electrical machine 20, 22, 24, 110 is operated as a generator, the electric energy generated by the electrical machine 20, 22, 24, 110 is used to drive at least one of the other electrical machines. The flow of electric energy here is conducted over the supply lines 148A through 148D, which are part of an intermediate current circuit of the electronic control arrangement 144. Thereby the electrical machine 20, 22, 24 and/or 110, operated as a generator, supply the electric current generated by them to the intermediate electronic circuit or makes the electric current available to the electronic control unit. This electric current can therefore be used to supply at least one other electrical machine.

The following will explain in greater detail three preferred operating modes of a tractor that is equipped with a drive system shown schematically in FIGS. 1 through 3. In addition to the three preferred operating modes, further operating conditions of the tractor are conceivable, which, however, are not explained explicitly.

In a first operating condition that is possible in a drive system 10, according to FIGS. 2 and 3, the first electrical machine 20 is operated as a generator. The second and the third electrical machines 22, 24 are operated as motors. The rotors 34, 36 of the second and the third electrical machines 22, 24 are connected to the first mechanical output interface 16, that is, the gear shifting point 56 is in its left, engaged position. Thereby in this operating mode the tractor is driven only by the two electrical machines 22, 24. The first operating mode is provided for an operating speed range of the tractor of up to 25 Km/hour in forward and reverse direction.

This first operating condition is also possible with the drive system 10 of FIG. 1. Thereby the gear shifting point 48 is in its left engaged condition and the gear shifting point 56 is in its left engaged condition. Thereby the two electrical machines 22, 24 are coupled to each other synchronously over the gear 54 and drive the first mechanical output interface 16.

In a second operating condition that is possible with the drive system 10 according to FIGS. 2 and 3, the fourth electrical machine 110, operated as a generator, can be driven by one part of the mechanical torque generated by the drive assembly 12. The second and third electrical machines 22, 24 are driven as motors with the electric energy generated by the fourth electrical machine 110. The mechanical torque generated by the second and third electrical machines 22, 24 can be transmitted to the first mechanical output interface 16 along with a further part of the mechanical torque generated by the drive assembly 12. In this operating condition the gear shifting point 56 is in its left engaged condition and the gear shifting point 78 is in its right engaged condition. Correspondingly the mechanical torque generated by the drive assembly 12 is branched in the summation gearbox 58 on the one hand to the fourth electrical machine 110 (over the mechanical output interface 60 of the planetary gearbox 58, the internal gear 66, the planet carrier 74, the sun gear 70, the hollow shaft 68, the gear 62, the shaft 116 and the gear 118) and on the other hand (over the mechanical output interface 60, the internal gear 66, the planet carrier 74, the hollow shaft 72, the gears 64 and 80) and therewith can be transmitted to the first mechanical output interface 16. In this second operating condition the drive system 10 is operated in a "speed/split" configuration. The second operating condition is intended for a slow forward operation at approximately up to 25 Km/hour with heavy towing by the tractor.

This second operating condition would also be possible with the drive system 10 according to FIG. 1, if the gear shifting point 48 is in its right engaged condition and the gear shifting point 56 is in its left engaged condition and when the gear shifting point 78 is in its right engaged condition. Then the second electrical machine 22 that is operated as a generator can be driven by one part of the mechanical torque generated by the drive assembly 12. The third electrical machine 24 is operated as a motor with the electric energy generated by the electrical machine 22. The mechanical torque generated by the third electrical machine 24 can be transmitted to the first mechanical output interface 16 along with a further part of the mechanical torque generated by the drive assembly 12 (over the interface 60, the internal gear 66, the planet carrier 74, the hollow shaft 72, the gears 64 and 80).

In a third operating condition, that is possible in the drive system 10, according to FIGS. 2 and 3, the first electrical machine 20 is operated as a generator. The fourth electrical machine 110 is operated as a motor. Thereby the mechanical torque generated by the fourth electrical machine 110 is transmitted along with the mechanical torque generated by the drive assembly 12 to the summation gearbox 58, combined in summation and transmitted to the first mechanical output interface 16. In this operating condition the gear shifting point 56 is in the right disengaged condition and the gear shifting point 78 in its right engaged condition. In this second operating condition the drive system 10 is operated in a "torque/split" configuration. The third operating condition is intended for operation at high speed of the tractor of, for example, 25 to 50 Km/h.

The third operating condition is also conceivable in the drive system 10 of FIG. 1. The gear shifting point 48 is in its right engaged condition and the gear shifting point 78 is in its right engaged condition. The first electrical machine 20 is operated as a generator and the second electrical machine 22 is operated as a motor. Thereby the mechanical torque generated by the second electrical machine 22 is transmitted over the shaft 40 to the gears 76, 62 to the summation gearbox 58 and transmitted along with the torque generated by the drive assembly 12 over the drive shaft 14 into the summation gearbox 58 and combined in summation over the gears 64, 80 to the first mechanical output interface 18.

In the three operating modes described above for the drive system 10 shown in FIGS. 2 and 3, the fourth electrical machine 110 can be operated as a motor. The mechanical torque generated by the fourth electrical machine 110 can be transmitted over the second mechanical output interface 18 when the gear shifting point 86 is in its engaged condition, the disk clutch 122 of FIG. 3 is in its engaged condition and either the gear shifting point 90 or the gear shifting point 96 is also in its engaged condition. Thereby the torque generated by the fourth electrical machine 110 is transmitted over the shaft 116, the gears 118, 62, the hollow shaft 68, the sun gear 70, the planet carrier 74, the shaft 84 (or the shafts 84A and 84B of FIG. 3) either to the chains 92, 94 or the chains 98, 100. In case that the disk clutch 82 of FIG. 2 is engaged, the mechanical torque generated by the fourth electrical machine 110 can be transmitted to the second mechanical output interface 18 along with one part of the mechanical torque generated by the drive assembly 12 into the summation gearbox 58. The same applies in case that the gear shifting point 120 of FIG. 3 is in its left engaged condition. Correspondingly the second mechanical output interface 18 can be driven on the one hand only by the mechanical torque generated by the electrical machine 110. On the other hand, the second mechanical output interface 18 can be driven by the mechanical torque generated by the fourth electrical machine 110 and combined in summation with one part of the mechanical torque generated by the drive assembly 12.

The mechanical output interface 18 can be driven in a comparable manner by the drive system 10 of FIG. 1 should the gear shifting point 48 be in its right engaged condition and the second electrical machine 22 is operated as a motor. Then, in particular, the mechanical torque generated by the second electrical machine 22 is transmitted to the sun gear 70 of the planetary gearbox 58 over the gears 76, 62 and the hollow shaft 68. This mechanical torque is transmitted over the planet carrier 74 when the shifting point 86 is in its engaged condition over the shaft 84 either over the chain 92, 94 or over the chain 98, 100 to the second mechanical output interface 18 depending on the question whether the gear shifting point 90 or the gear shifting point 96 is in its engaged condition. Most appropriately for this purpose the first electrical machine 20 could be operated as a generator and the third electrical machine 24 could be operated as a motor and thereby connect the third electrical machine 24 with the first mechanical output interface 16 when the gear shifting point 78 is engaged.

Figure 4:
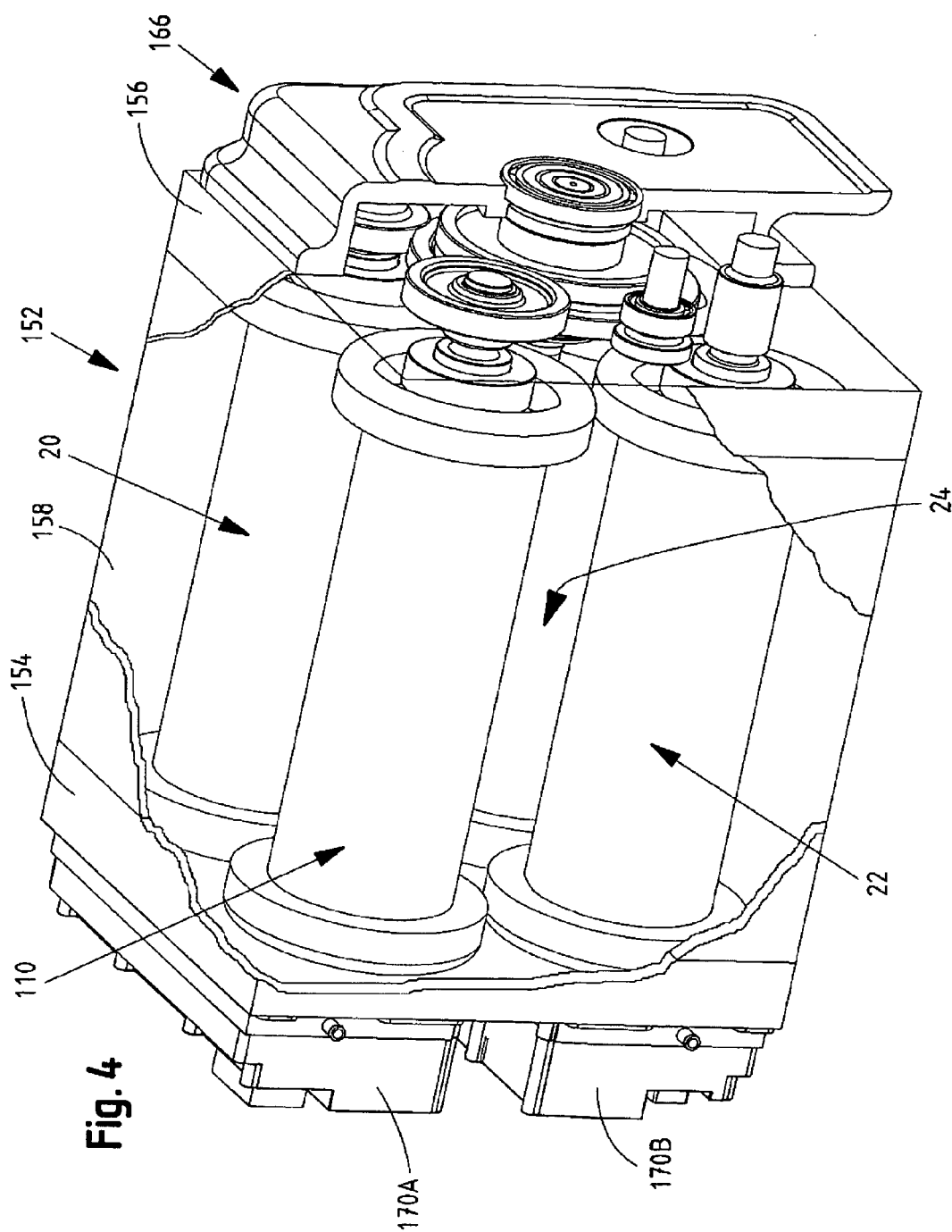
FIG. 4 shows a schematic perspective view of an arrangement of electric machines according to the invention.

FIG. 4 shows a housing arrangement 152 in or on which the four electrical machines 20, 22, 24 and 110 are arranged or enclosed. In each case two electrical machines—for example 22, 24 or 110—are arranged adjacent to each other spatially. The electrical machine 20 is arranged directly adjacent to the electrical machines 110 and 24 as well as across the diagonal to the electrical machine 22. This applies analogously to the other three electrical machines 22, 24, 110.

The stators 26, 28, 30, 112 of the electrical machines 20, 22, 24, 110 are arranged in the common housing arrangement 152. The electrical machines 20, 22, 24, 110 are arranged in the housing arrangement 152 in such a way that the shafts 38, 40, 42, 116 of the rotors 32, 34, 36, 114 of the electrical machines 20, 22, 24, 110 project from one side of the housing arrangement 152. The housing arrangement 152 is provided with two closures 154, 156 each of which is configured as an end shield. The stators 26, 28, 30, 112 of the four electrical machines 20, 22, 24, 110 can be fastened to the two closures 154, 156.

The closure 154 is arranged on one side of the housing arrangement 152. The other closure 156 is arranged on the opposite side of the housing arrangement 152 from the above.

The housing arrangement 152 includes a central part 158 that is provided with a metal structure for the support of the four electrical machines 20, 22, 24, 110. The metal structure is configured in the form of a stack and includes a metallic stack of sheet metal parts. Such a sheet metal part 160 forming the center part 158 is shown in FIG. 6. The sheet metal part 160 is provided with generally circular recesses 162A through 162D for the stators 26, 28, 30, 112 of the four electrical machines 20, 22, 24, 110. The grooves or channels 163, arranged generally in radial direction of a recess 162A through 162D, are used to enclose the stator windings. The drive shaft 14 extends through the recess 164. Corresponding recesses are also provided in the two closures 154, 156. Thereby the shaft 14 extends through the housing arrangement 152.

FIG. 5 shows the center section 158 of the housing arrangement 152, which is composed of the individual sheet metal parts 160, where the four recesses 162A through 162D can be seen in the simplified illustration (without the grooves/channels 163) for the four electrical machines 20, 22, 24, 110 as well as the recess 164 arranged in the center for the drive shaft 14. Thereby the center part 158 of the housing arrangement 152 can be formed in such a way that several sheet metal parts 160, shown in FIG. 6 electrically insulated from each other, are fastened to the end face 168, shown in FIG. 5, of the center part 158.

The electrical machines 20, 22, 24, 110 are arranged in space in such a way that their shafts 38, 40, 42, 116 are generally oriented parallel to each other and project outward from one side of the housing arrangement 152, they penetrate the closure 156. As seen in FIG. 4 at the right from the center part 158—shown only schematically—one part of the structure of the gearbox housing 104 indicated, for example, by FIGS. 1 and 2, is arranged so as to follow, and is now characterized in FIG. 4 by the part number callout 166. From the center part 158 to the left as seen in FIG. 4,—indicated only schematically—two electronic control assemblies 170A and 170b, are fastened to the left closure 154 of the housing arrangement 152 where each of which is connected electrically to the electrical machines 20, 22, 24, 110.

In closing it should be noted particularly that the embodiments explained above are used solely for the description of the teaching claimed, but do not limit these to the embodiments.

NOMENCLATURE 010 drive system
012 drive assembly, internal combustion engine
014 shaft, drive shaft
016 first mechanical output interface
018 second mechanical output interface
017 gear
020 electrical machine, first electrical machine
022 electrical machine, second electrical machine 024 electrical machine, third electrical machine
026 stator
028 stator
030 stator
032 rotor
034 rotor
036 rotor
038 shaft
040 shaft
042 shaft
044 gear
046 gear
048 gear shifting point
050 gear
052 gear
054 gear
056 gear shifting point
058 summation gearbox
060 mechanical output interface
062 mechanical output interface, gear
064 mechanical output interface, gear
066 internal gear
068 hollow shaft
070 sun gear
072 hollow shaft
074 planet carrier
076 gear
078 gear shifting point
080 gear
082 clutch
084 shaft
086 gear shifting point
088 rotating part
090 gear shifting point
092 gear or chain
094 gear
096 gear shifting point
098 gear
100 gear
104 area of dashed lines, gearbox housing assembly
106 area of dashed lines, differential gearbox housing assembly
108 area of dashed lies, power take-off shaft housing assembly
102 area of dashed lines, Internal combustion engine assembly
110 electrical machine, fourth electrical machine
112 stator
114 rotor
116 shaft
118 gear
120 gear shifting pointclaw clutch
122 disk clutch
124 rear axle differential gearbox
126 bevel gear
128 gear
130 shaft
132 sun gear
134 planetary gearbox, intermediate gearbox
136 internal gear
138 planet carrier
140 drive shaft
142 wheel (of the tractor)
144 control arrangement, electronic control arrangement
146 electronic control unit
148 control lines
150 converter unit, rectifier unit
152 housing arrangement
154 closure
156 closure, end shield
158 center part
160 sheet metal part
162 recess
163 grooves/channels
164 recess
166 housing
170 electronic power control assembly

The invention claimed is:

1. A drive system for one of an agricultural and industrial utility vehicle, with a drive assembly that generates a mechanical torque, a first, a second and a third electrical machine, a first mechanical output interface used to drive at least one vehicle axle, and a second mechanical output interface, where one of the electrical machines is provided with a rotor that is connected, fixed against rotation, to a shaft, where a shaft driven by the drive assembly is connected, so as to rotate, with the shaft of the first electrical machine, and where an operating implement that is coupled to the utility vehicle is operated mechanically with the second mechanical output interface, where one of the shaft of the second electrical machine and the shaft of the third electrical machine is selectively connected with the first mechanical output interface, wherein at least two of the three electrical machines are enclosed in a common housing arrangement in such a way that the shafts of the electrical machines project from a single side of the housing arrangement.

2. The drive system according to claim 1, wherein at least two of the electrical machines are arranged spatially adjacent to each other.

3. The drive system according to claim 1, wherein at least two of the electrical machines are provided with a stator and the stators of the at least two electrical machines are arranged in the common housing.

4. The drive arrangement according to claim 1, wherein the housing arrangement is provided with at least one closure to which at least two electrical machines are fastened.

5. The drive system according to claim 4, wherein the housing arrangement is provided with two closures, one closure being arranged on a one side of the housing arrangement and the other closure being arranged on an opposite side of the housing arrangement from the one side.

6. The drive system according to claim 1, wherein the housing arrangement is provided with a center part which is provided with a metal structure that supports at least two electrical machines.

7. The drive system according to claim 1, wherein at least two electrical machines are cooled by a common cooling arrangement that is provided in a center part of the housing arrangement.

8. The drive system according to claim 1, wherein at least two of the electrical machines are arranged spatially in such a way that their shafts are generally oriented parallel to each other.

9. The drive system according to claim 1, wherein at least two electrical machines are arranged in the housing arrangement in such a way that they project from one side of the housing arrangement.

10. The drive system according to claim 1, wherein the shafts of the second and third electrical machines are coupled to each other synchronously over a gear.

11. The drive system according to claim 1, wherein a fourth electrical machine is provided and is coupled to at least one of the first and the second mechanical output interface and the fourth electrical machine is arranged spatially adjacent to one of the first through third electrical machines in the housing arrangement.

12. The drive system according to claim 11, wherein in order to combine in a summation the torque generated by the drive assembly and the torque generated by an electrical machine a summation gearbox with three mechanical output interfaces is provided, the first mechanical output interface of the summation gearbox being coupled to a shaft of the drive assembly, the second mechanical output interface of the summation gearbox coupled to the shaft of an electric machine and the third mechanical interface of the summation gearbox is coupled reversibly with at least one of the first mechanical output interface and the second mechanical output interface of the drive system.

13. The drive system according to claim 12, wherein the summation gearbox is provided with a planetary gearbox, the shaft driven by the drive system being connected, fixed against rotation, to an internal gear of the planetary gearbox, a planet carrier of the planetary gearbox being coupled reversibly to the first mechanical output interface and a sun gear of the planetary gearbox being coupled reversibly to at least one of the second, third and fourth electrical machines.

14. The drive system according to claim 13, wherein the shaft of the fourth electrical machine is connected so as to drive the sun gear of the planetary gearbox.

15. The drive system according to claim 13, wherein at least one of the planet carrier of the planetary gearbox and a shaft driven by the drive assembly is coupled reversibly with the second mechanical output interface, by way of one of a disk clutch and a claw clutch.

16. The drive system according to claim 11, having a first operating condition in which the first electrical machine is operated as a generator and the second and the third electrical machines are operated as motors and are connected with the first mechanical output interface.

17. The drive system according to claim 16, having a second operating condition in which the fourth electrical machine is operated as a generator and is driven with one part of a mechanical torque generated by the drive assembly, the second and the third electrical machines being operated as motors and where a mechanical torque generated by the second and third electrical machines along with a further part of the mechanical torque generated by the drive assembly is transmitted to the first mechanical output interface.

18. The drive system according to claim 17, having a third operating condition in which the first electrical machine is operated as a generator and the fourth electrical machine is operated as a motor and where a mechanical torque generated by the fourth electrical machine together with the mechanical torque generated by the drive assembly is combined in summation and transmitted to the first mechanical output interface.

19. The drive system according to claim 18, wherein the fourth electrical machine is operated as a motor and the mechanical torque generated by the fourth electrical machine and at least one part of the mechanical torque generated by the drive assembly is transmitted to the second mechanical output interface when a corresponding clutch is engaged.

20. The drive system according to claim 1, wherein at least one of the electrical machines is driven as a generator and that at least one of the two other electrical machines is driven by the electrical energy generated by the electrical machine driven as a generator.

21. The drive system according to claim 20 wherein an intermediate current circuit is provided and is supplied with electric current by an electrical machine operated as a generator and with which at least one electrical machine can be supplied with electric current and the intermediate current circuit is provided with a direct current circuit.

22. The drive system according to claim 1, wherein the electrical machines are at least one of generally configured identically and are provided with a generally comparable power characteristic.

23. A stator arrangement of an electrical machine with a recess to enclose a rotor of the electrical machine, wherein at least one further recess encloses at least one further rotor the recesses being arranged in the stator arrangement in such a way that a housing arrangement according to 1 is attained.

24. A tractor having a drive system according to claim 1.

* * * * *